United States Patent
Stanich et al.

(10) Patent No.: US 10,549,523 B2
(45) Date of Patent: Feb. 4, 2020

(54) INK DEPOSITION CURVE COMPUTATION MECHANISM

(71) Applicant: Ricoh Company, Ltd., Tokyo (JP)

(72) Inventors: Mikel John Stanich, Longmont, CO (US); Vincent William Ferreri, Frederick, CO (US); Nikita Gurudath, Boulder, CO (US); Larry M. Ernst, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/909,410

(22) Filed: Mar. 1, 2018

(65) Prior Publication Data

US 2019/0270304 A1    Sep. 5, 2019

(51) Int. Cl.
| G06F 3/12 | (2006.01) |
| B41F 33/00 | (2006.01) |
| B41J 2/175 | (2006.01) |

(52) U.S. Cl.
CPC ...... B41F 33/0009 (2013.01); B41F 33/0045 (2013.01); B41J 2/17566 (2013.01); *B41J 2002/17569* (2013.01); *B41J 2002/17589* (2013.01)

(58) Field of Classification Search
CPC ... B41F 33/0009; B41F 33/0045; B41J 2/125; B41J 2/2135; B41J 2/17546; B41J 2/17566; B41J 2002/17569; B41J 2002/17589; H04N 1/00005; H04N 1/6003; H04N 1/4074; G06Q 30/04; G06Q 30/0283
USPC ................. 358/1.1–1.18, 402, 1.9
See application file for complete search history.

(56) References Cited

U.S. PATENT DOCUMENTS

| 5,278,411 A | 1/1994 | Popil et al. |
| 5,349,377 A | 9/1994 | Gilliland et al. |
| 5,937,225 A | 8/1999 | Samuels |
| 6,463,173 B1 * | 10/2002 | Tretter .................. G06T 5/009 |
| | | 382/162 |
| 8,289,572 B2 | 10/2012 | Ernst et al. |
| 8,690,839 B2 * | 4/2014 | Xia .................... A61M 39/1011 |
| | | 604/187 |
| 8,712,925 B2 | 4/2014 | Clark et al. |
| 8,734,034 B2 | 5/2014 | Morovic et al. |
| 8,807,695 B1 | 8/2014 | Mantell et al. |
| 9,661,154 B1 | 5/2017 | Stanich et al. |

(Continued)

FOREIGN PATENT DOCUMENTS

JP    5836343    11/2015

OTHER PUBLICATIONS

European Search Report for EP Application No. 19159696.4, 9 pages, dated Jul. 19, 2019.

*Primary Examiner* — Gabriel I Garcia
(74) *Attorney, Agent, or Firm* — Jaffery Watson Mendonsa & Hamilton LLP

(57) ABSTRACT

A system is disclosed. The system at least one physical memory device to store ink deposition curve compute logic and one or more processors coupled with the at least one physical memory device, to execute the ink deposition curve compute logic to receive a histogram for each of a plurality of color planes, receive ink measurement data for each of the plurality of color planes, compute ink deposition curve data for each of the plurality of color planes based on the histograms and the ink measurement data and transmit the ink deposition curve data.

20 Claims, 7 Drawing Sheets

(56) References Cited

U.S. PATENT DOCUMENTS

| | | | |
|---|---|---|---|
| 2005/0008222 A1* | 1/2005 | Gallina | H04N 1/608 382/162 |
| 2007/0115310 A1* | 5/2007 | Walmsley | B41J 2/04528 347/9 |
| 2008/0111842 A1 | 5/2008 | Hall et al. | |
| 2013/0101328 A1* | 4/2013 | Morovic | H04N 1/00005 400/76 |
| 2014/0210898 A1 | 7/2014 | Mantell et al. | |
| 2016/0360072 A1 | 12/2016 | Inamura et al. | |

* cited by examiner

INK DEPOSITION CURVE COMPUTATION MECHANISM

FIELD OF THE INVENTION

The invention relates to the field of printing systems, and inparticular, to determining an ink deposition curve for a printing system.

BACKGROUND

In commercial and transactional printers, various system settings need to be provided to ensure optimum printing performance. One such printer setting is an ink deposition curve, which is a vector (e.g., measured offline) of the average amount of ink in a pixel (or ink in a unit per area) deposited at a printer for different gray levels; where more ink is provided as the gray level increases and no ink is applied for white. However, conventional methods of determining an ink deposition curve for a printer requires performing a halftoning operation, which requires detailed knowledge of the halftone design and is compute intensive.

Accordingly, an improved mechanism to compute an ink deposition curve for a printer is desired.

SUMMARY

In one embodiment, a method is disclosed. The method includes receiving a histogram for each of a plurality of color planes, receiving ink measurement data for each of the plurality of color planes, computing ink deposition curve data for each of the plurality of color planes based on the histograms and the ink measurement data and transmitting the ink deposition curve data.

BRIEF DESCRIPTION OF THE DRAWINGS

A better understanding of the present invention can be obtained from the following detailed description in conjunction with the following drawings, in which.

DETAILED DESCRIPTION

A mechanism to compute an ink deposition curve for a printing system is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

Figure 1:
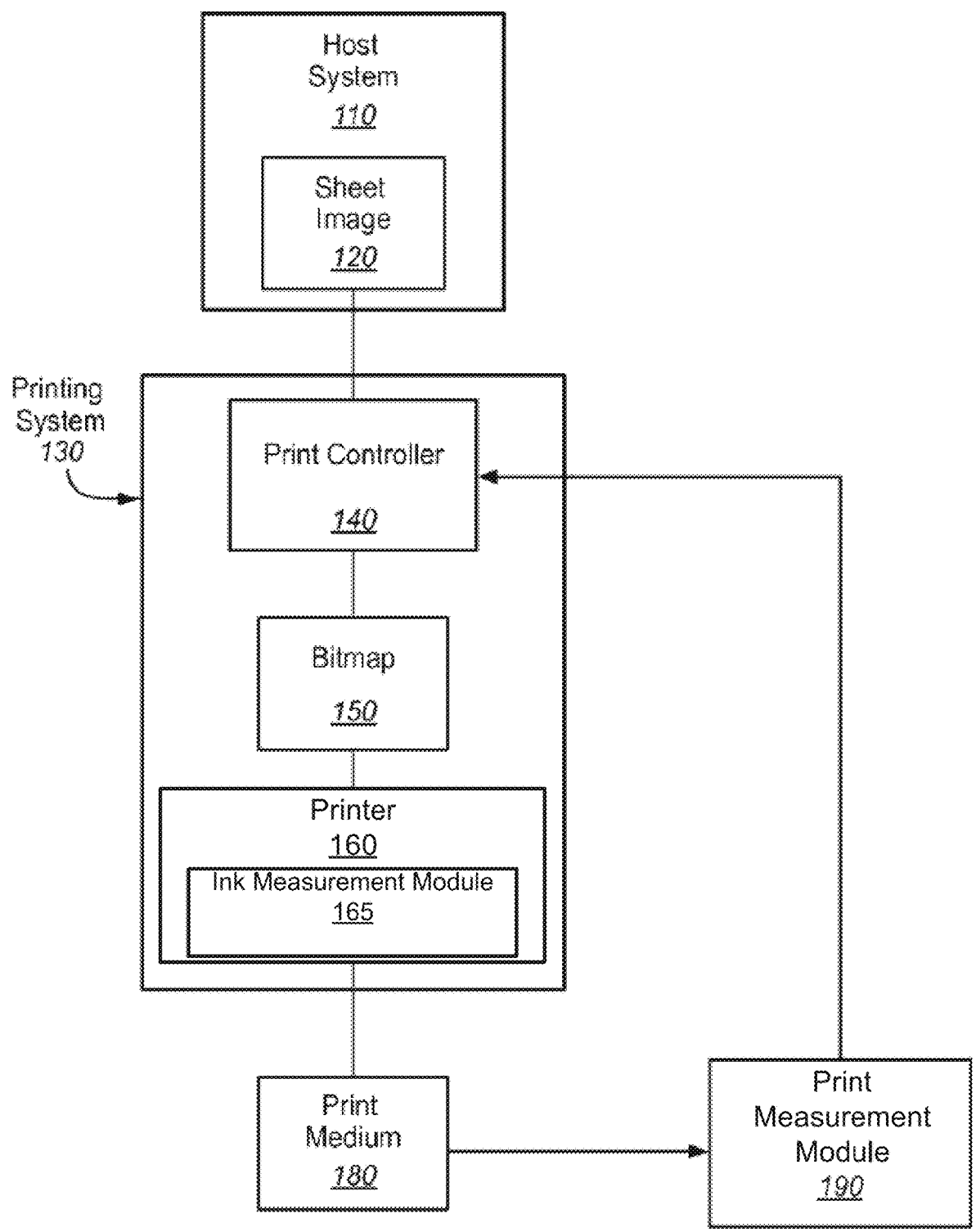
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 (e.g., paper) via a printer 160. The resulting print medium 180 may be printed in color and/or in any of a number of gray shades, including black and white (e.g., Cyan, Magenta, Yellow, and blacK, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for printing to the print medium 180 via the printer 160. The printing system 130 may be a high-speed printer operable to print relatively high volumes (e.g., greater than 100 pages per minute). The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. Print controller 140 and printer 160 may both be implemented in the same device or in separate devices with coupling.

Print measurement module 190 may be any system, device, software, circuitry and/or other suitable component operable to measure and process the spectral information of ink printed on medium 180 on a per color basis (e.g., print measurement data). In one embodiment, print measurement module 190 is implemented as a spectrophotometer to obtain print measurement data such as optical densities (OD) of the images of the test print job printed on medium 180. Print measurement module 190 communicates the print measurement data with print controller 140 to be used in processes such as determining an ink deposition curve. The print measurement module 190 may be a stand-alone process or be integrated into the printing system 130.

According to one embodiment, printer 160 includes an ink measurement module 165. Ink measurement module 165 may be any system, device, software, circuitry and/or other suitable component operable to measure and process ink usage by printer 160 on a per color basis (e.g., ink measurement data). In one embodiment, ink measurement data includes the total quantity (volume or mass) of ink for each primary color used to print a specific job or number of pages.

Ink measurement module 165 communicates the ink measurement data with print controller 140 to be used in processes such as determining an ink deposition curve. The ink measurement module may include any combination of pumps, flow meters, weighing devices, ink drop counters, ink drop size data and associated processing suitable to generate ink measurement data. Ink measurement module 165 may be a stand-alone process or be integrated into the printer 160.

In addition, measurements of the rasterized (e.g., RIP) data from the print controller 140 are used to generate histograms of the print data for each color plane. In this case, a histogram indicates how many output pels for each input digital count or gray level were printed for the same specific print job or number of pages that correspond to the ink measurements. The histogram data may have total pel counts for a range of gray levels using wider buckets, instead of having buckets with pel count data for individual gray levels.

Figure 2:
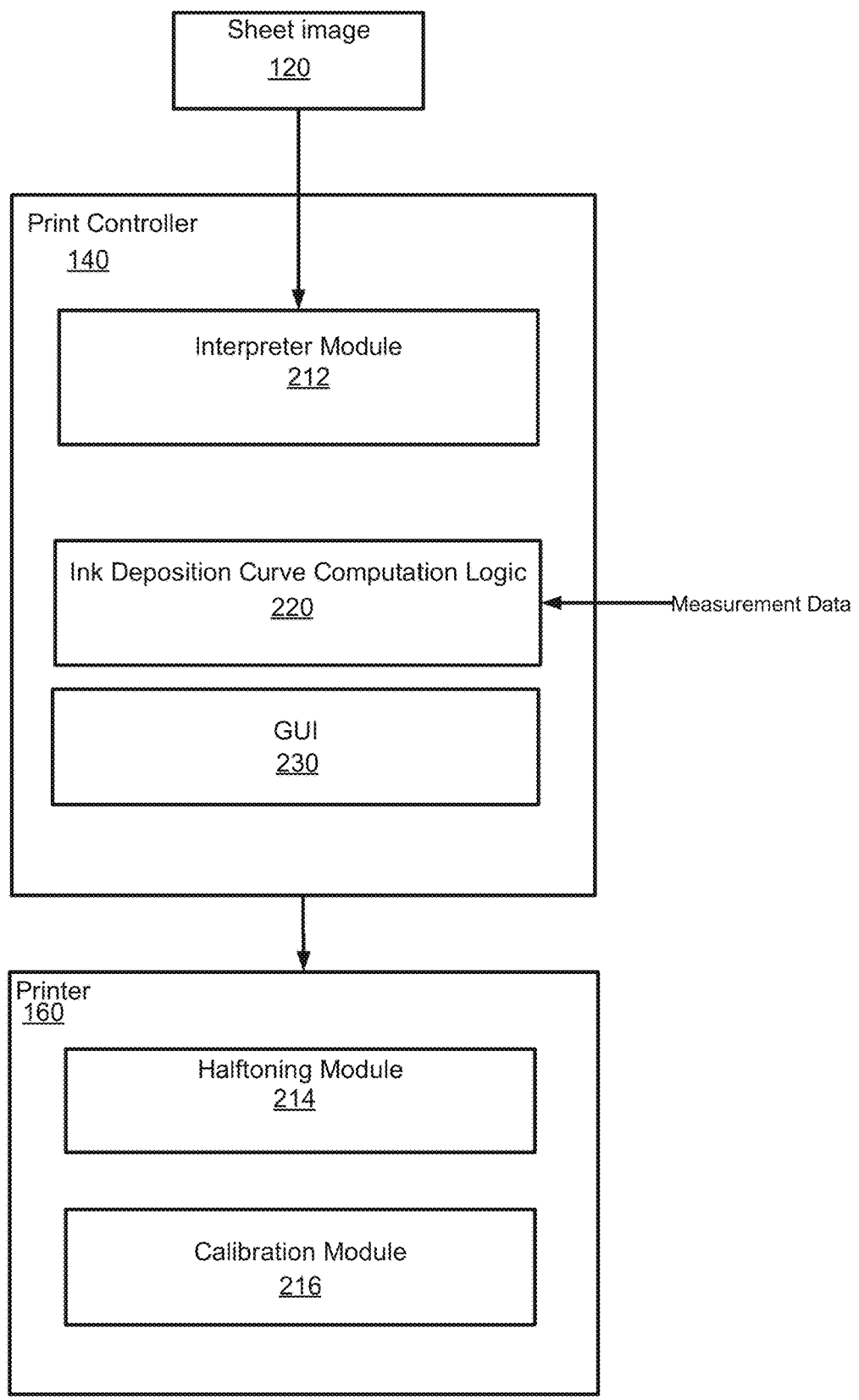
FIG. 2 is a block diagram illustrating another embodiment of a printing system.

FIG. 2 is a block diagram illustrating one embodiment of a print controller 140 coupled to printer 160. The print controller 140 (e.g., DFE or digital front end), in its generalized form, includes interpreter module 212, and ink deposition curve compute logic 220, while printer 160 includes halftoning module 214 and calibration module 216. In other embodiments, halftoning module 214 and/or calibration module may both be implemented in print controller 140 or in separate devices with coupling.

Interpreter module 212 is operable to interpret, render, rasterize, or otherwise convert images (e.g., raw sheetside images such as sheet image 120) of a print job into sheetside bitmaps. The sheetside bitmaps generated by interpreter module 212 are each a 2-dimensional array of pixels representing an image of the print job (e.g., a Continuous Tone Image (CTI) or contone), also referred to as full sheetside bitmaps.

The 2-dimensional pixel arrays are considered "full" sheetside bitmaps because the bitmaps include the entire set of pixels for the image. Interpreter module 212 is operable to interpret or render multiple raw sheetsides concurrently so that the rate of rendering substantially matches the rate of imaging of production print engines. The continuous tone data is transmitted to the printer 160.

Halftoning module 214 is operable to represent the sheetside bitmaps as halftone patterns of ink. For example, halftoning module 214 may convert the pixels to halftone patterns of CMYK ink for application to the paper. In such an embodiment, halftoning is performed outside of print controller 140 and within printer 160 since the halftoned data (e.g., drop size) is not available to print controller 140.

Calibration module 216 is implemented to calibrate printer 160 to a target calibration printer response for a nominal operating environment, printer settings, and target media. In one embodiment, target calibration printer response and histogram data, in addition to an ink model that relates the target OD values to ink deposition levels across the entire tone range, are used to compute an estimate of the amount of ink (e.g., ink volume or mass) used by printer 160 on a per color basis (e.g., ink estimation data).

Using the difference between the estimated ink amount and measured ink amount as a cost function, parameters in the ink model are varied using a non-linear optimization until the cost function is minimized. Once the cost function is minimized, the ink model accurately predicts the relationship between target values and ink deposition. Combining the results after convergence from the ink model with its optimized parameters and target calibration printer response, an ink deposition curve for the calibrated printer system can be obtained. The ink model relates target OD values to ink deposition (e.g. Optical Density (OD) vs ink deposit levels (micro liters per square centimeter)). An example of the target calibration printer response is Linear OD versus gray level.

Ink deposition curve compute logic 220 is implemented to compute the ink deposition curve. According to one embodiment, ink deposition curve compute logic 220 receives ink measurement data (volume or mass) from ink measurement module 165 for each primary color ink (e.g., CMYK, MICR, coatings or other marking materials) installed at printer 160 and histogram data from print controller 140.

In one embodiment, the ink measurement data corresponds to the data in the histogram in that they both represent data for the same printed pages. The ink measurement data and histogram data may be either associated with the same test print job or cover the same printing in a given time period. In a further embodiment, ink deposition curve compute logic 220 also receives ink measurement data indicating an ink supply quantity used to complete the printing of a test print job at printer 160 on a per color basis.

In one embodiment, a test print job is used to facilitate an ink measurement process that measures the ink supply usage quantity (volume or mass) for each primary ink color used to print the test print job. A test print job having image content that prints for the entire tone range aids the accuracy of the ink deposition curve. In a further embodiment, a number of prints to be printed in the test print job are determined so that an estimated ink volume (or mass) to be used in printing the test print job is significantly greater than a magnitude of errors associated with an ink volume (or mass) measurement process performed at ink measurement module 165. Subsequently, the estimated number of prints is printed at printer 160 using the printer settings and printer operating environment. Once printing of the test job is commenced, printer 160 may be printed continuously with minimized downtime in order to maximize accuracy of the ink measurement process.

In other embodiments, the process can also be operated in a real-time manner to monitor the operation of the printer. In such a system, generation of the ink deposition curve is made on a continuous basis. To begin this process, an accurate ink model and ink deposition curve is determined immediately following the calibration of the printer system 130. Once the ink model and ink deposition curve are accurately established for the calibrated system, the print system 130 is monitored and ink deposition curves are generated based on the continuous reporting of data (e.g., ink measurement data) from the printer combined with continuous generation of histogram data.

The continuously generated ink deposition curves combined with the once determined accurate ink model are used to generate printer response curves (e.g. OD versus grey level or OD versus digital count) indicating the current state of the printer. The difference between the current state of the printer and the target calibrated printer response is dynamically used to determine how much drift from the initial calibrated state has occurred (e.g. OD changes for the entire tone range). It should be appreciated that this drift information is based on non-OD measurement data from the printer. Thus, the drift information provides a means to infer OD changes occurring in the printer system 130 based on ink measurements data and histogram data. Utilizing such a system permits one to stop a printer system from operating when it has drifted too far from the desired target calibrated printer response.

Ink deposition curve compute logic 220 may also be implemented to compute the ink deposition curve when ink jet flushing operations are active during the printing of the test print job. In one embodiment, the measurement data includes a measurement of the ink consumed during flushing operations performed for each color plane, as well as the actual ink used to print each color plane of the print job.

If the histogram data includes the flushing ink, the ink model regression uses the total ink reported from printer 160 including flushing ink. If the histogram data does not include the flushing ink, the quantity of flushing ink per color plane that occurred during the printing of the test pages is subtracted from the measured ink data (which may in that case be considered raw measured ink data) to obtain corrected measured ink data amounts, which are then used in the ink model regression process or ink deposition curve generation process.

Ink deposition curve compute logic 220 may receive the quantity of flushing ink per color plane that occurred during the printing of the test pages. Alternatively, ink deposition curve compute logic 220 may determine the quantity of flushing ink per color plane that occurred during the printing of the test pages based on a known flushing ink flow rate and a known applicable period of the printing of the test pages (e.g., micro liters of ink per page times the number of printed pages).

In a further embodiment, ink deposition curve compute logic 220 generates a histogram (e.g., a distribution of a number of pixels for every gray level) for each color plane implemented to print the test print job. In such an embodiment, a histogram is generated by receiving contone images corresponding to each color plane of the test print job and performing a digital count value (e.g., 0%-100%) for each pel over a total range of allowable digital count values (e.g., 0-255). For a contone image, the total number of grey levels per color plane=$2^n$, where n=bit depth. Accordingly, four histograms are generated to define all possible colors for a print job in the CMYK color space and still other planes (e.g., MICR or Protector Coat) can have their histograms generated too.

Ink deposition curve computation logic block 220 may compute ink deposition curve data, based on the histogram and the ink measurement data. In one embodiment, the ink deposition curve is computed by using an ink model. An ink model represents an optical density (OD) versus deposition (e.g., ink coverage per unit area) relationship for the print system 130. In such an embodiment, the optical density versus deposition relationship is computed using a four parameter Weibull function. However other embodiments may implement other functions to compute an optical density versus deposition relationship. In still other embodiments, a lookup table may be implemented.

In another embodiment, the printing system 130 is operated in an uncalibrated manner using an identity transfer function in the engine calibration system. In this case, the uncalibrated printer response (e.g., OD versus grey level response) is determined based on the print measurement data correlated to the corresponding grey levels of the images of the test print job) on a per color basis. The ink model and ink deposition curve are generated for this uncalibrated system as described previously based on the uncalibrated printer response, histogram and ink usage. Such a system achieves maximum printing and ink delivery capability (e.g. maximum possible OD and maximum ink deposition). Based on the ink model, a different ink deposition curve can be computed for any target calibration printer response. Therefore, the amount of ink deposition can be determined for the general case for any target printer response.

The target OD, by definition, is less than the uncalibrated OD and the ink deposition is less than the maximum delivery possible for the system this is an interpolation, which provides the highest accuracy. Multiple ink curves may be computed in this way for different ink modes such as Premium, Better and Good, which each have corresponding printer responses.

After computation, ink deposition curve compute logic 220 transmits the ink deposition curve for installation at printer 160 to assist with any future printer functions requiring the ink deposition curve. In other embodiments, the ink deposition curves, ink model parameters, printer settings and/or OD drift estimates may be transmitted to a computing device (e.g., host 110) or accessed via GUI 230.

Figure 3:
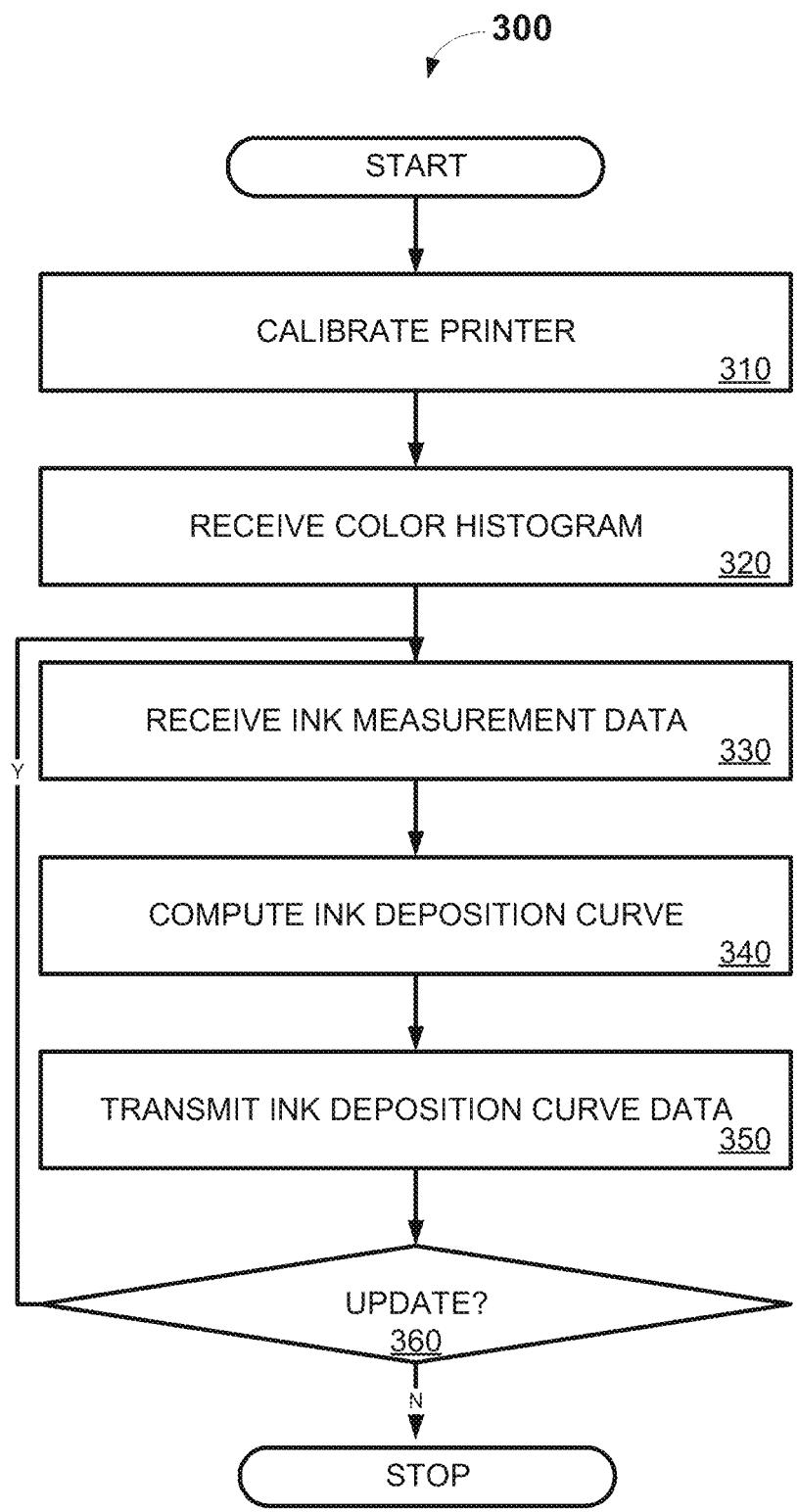
FIG. 3 is a flow diagram illustrating one embodiment for performing an ink deposition curve computation process.

FIG. 3 is a flow diagram illustrating one embodiment of a process 300 for computing an ink deposition curve. Process 300 may be performed by processing logic that may comprise hardware (e.g., circuitry, dedicated logic, programmable logic, etc.), software (such as instructions run on a processing device), or a combination thereof. In one embodiment, process 300 may be performed by the ink deposition curve computation logic block 220. The process 300 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1&2 are not discussed or repeated here.

Figure 4:
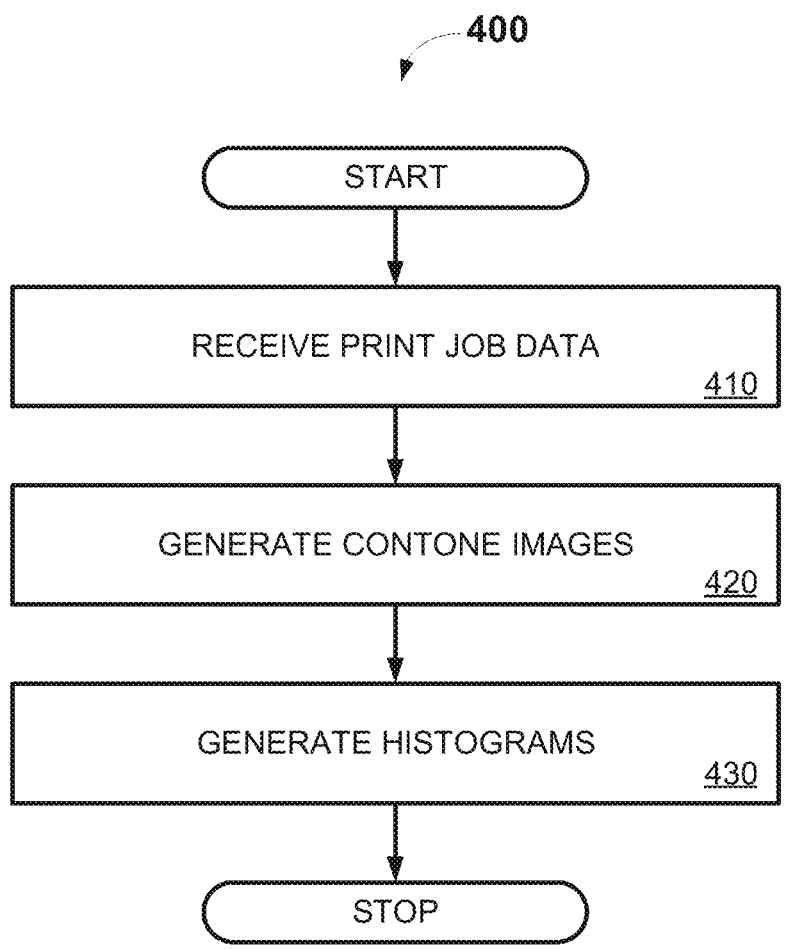
FIG. 4 is a flow diagram illustrating one embodiment of a process for generating histograms.

Process 300 begins at processing block 310, where printer 160 is calibrated. At processing block 320, histograms are received for each color plane. As discussed above, the color histograms are generated based on contone images corresponding to each color plane for a test print job. FIG. 4 is a flow diagram illustrating one embodiment of a process 400 for generating histograms. At processing block 410, print job data for a test print job is received. In one embodiment, a job ticket (e.g., Job Definition Format (JDF)) is also received with the print job data. In another embodiment, the test print job data is stored and retrieved in printing system 130 for printing. At processing block 420, contone images are generated based on the print job, and job ticket if included. At processing block 430, histograms are generated for each color plane based on the contone images.

Figure 5:
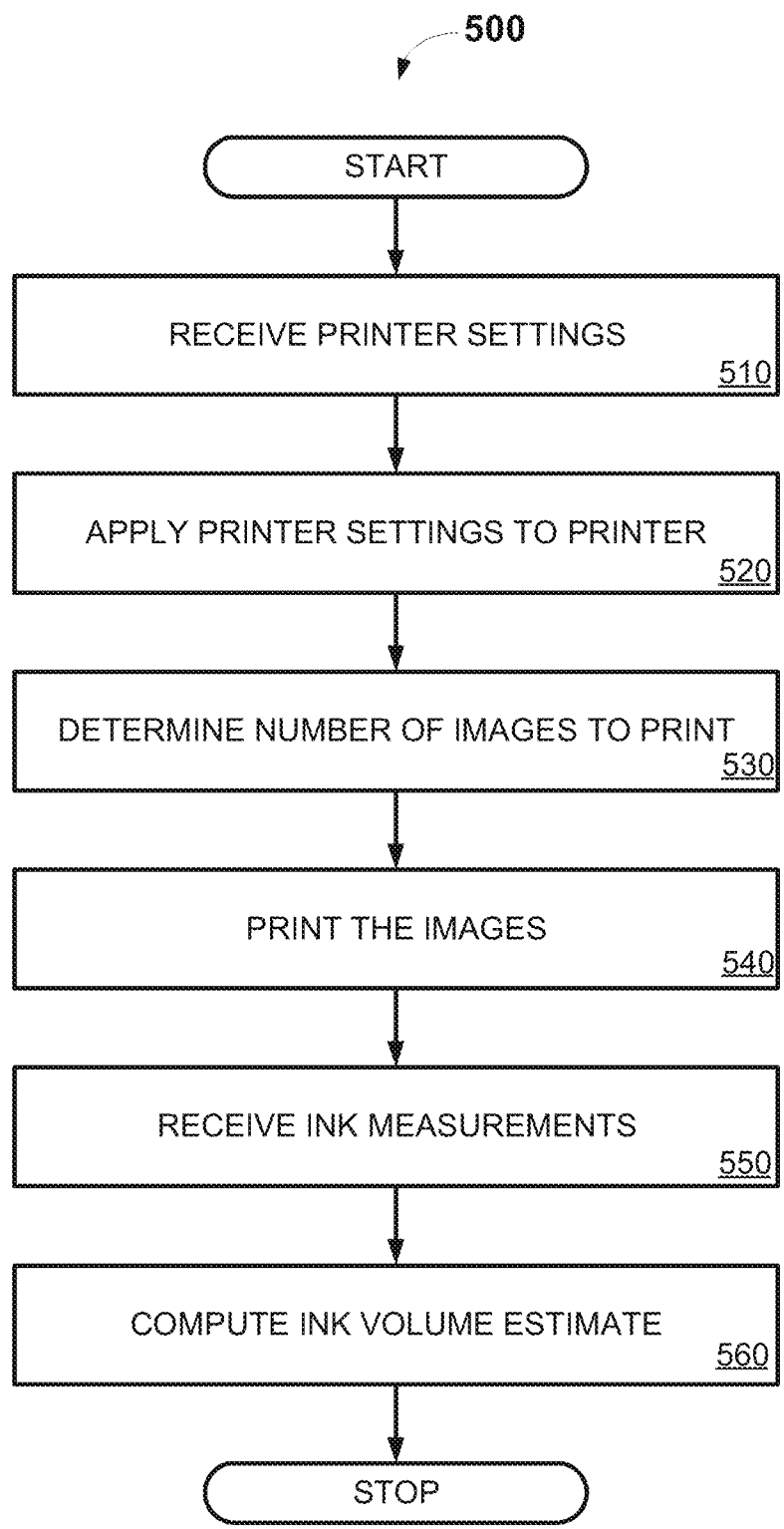
FIG. 5 is a flow diagram illustrating one embodiment of a process for computing an ink usage estimate.

Referring back to FIG. 3, ink measurement data (e.g., ink usage measurement) per color plane are received, at processing block 330. As discussed above, ink estimations (e.g., ink usage estimations) may be computed using ink measurement data captured during printing of the test print job. FIG. 5 is a flow diagram illustrating one embodiment of a process 500 for computing an ink estimate.

At processing block 510, printer settings data is received. In one embodiment, the printer settings data includes print resolution, flushing pattern, undercoat/overcoat pattern, ink selection, model printer, inkjet printhead and/or drive waveforms which may be received (e.g., via GUI 230). At processing block 520, the printer settings are applied to printer 160. At processing block 530, the number of print images to be included in the test print job is determined. At processing block 540, the test print job is printed. At processing block 550, ink measurement data is received from ink measurement module 165 for each color plane.

As discussed above, the ink measurement data includes ink used to print the test print job, as well as ink consumed during flushing. Moreover, as described previously, the measured ink data may need to be adjusted in the process depending on the manner in which the histogram data is determined (e.g., with or without flushing). At processing block 560, the print measurement data is received from print measurement module 190 and the estimated ink usage (volume or mass) per color plane is computed based on the print measurement data. Processing block 560 may be skipped in embodiments in which the ink measurements are received, processing block 550, but an ink estimate is not needed.

Referring back to FIG. 3, ink deposition curve data is computed for each color plane based on the ink measurement data and the color histograms, processing block 340. At processing block 350, the ink deposition curve data is transmitted (e.g., reported) and may also include the printer settings data. In one embodiment, ink deposition curve data is transmitted for display via GUI 340. However, in other embodiments, the ink deposition curve data may be transmitted to printer 160 for subsequent installation and implementation at printer 160.

At decision block 360, a determination is made as to whether there has been an update to print system 130 requiring the ink deposition curve data to be recomputed. Updates requiring a recomputed ink deposition curve may include printer settings changes that affect ink drop size (e.g. inkjet printhead driver waveforms and changes to ink types/sets.) If so, control is returned for execution of processing blocks 330-360.

Figure 6:
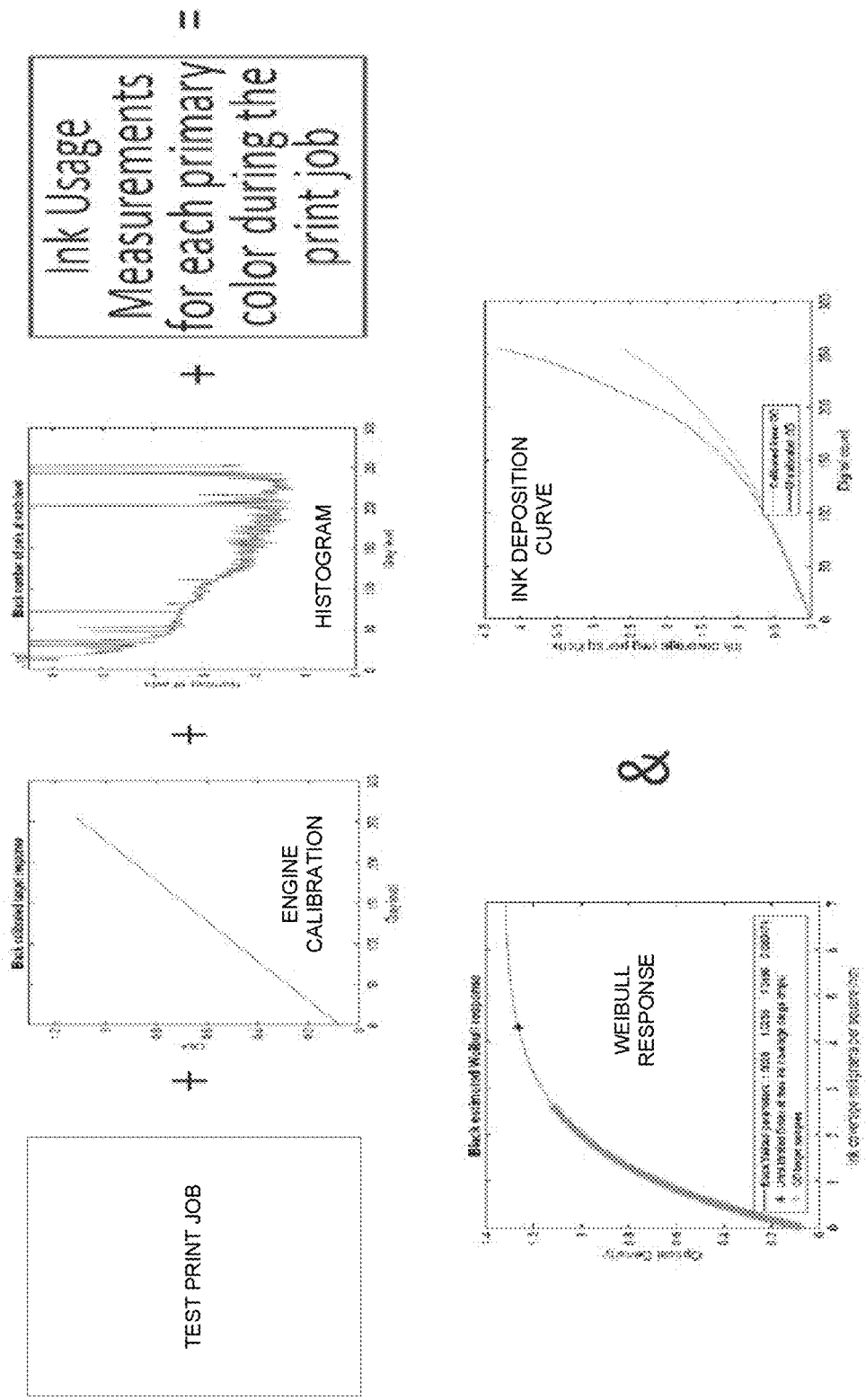
FIG. 6 is a graphic flow diagram illustrating one embodiment of a process for computing an ink deposition curve.

FIG. 6 is a graphic flow diagram illustrating one embodiment of a process for computing an ink deposition curve based on test print job, calibration printer response data, histogram data and ink usage measurements. As shown in FIG. 6, the ink deposition curve for an uncalibrated printer is also shown, which was determined using the uncalibrated printer OD response instead of the linear OD calibrated response. This illustrates the multiple ink deposition curve determination capability based on alternate measured responses or target responses.

Figure 7:
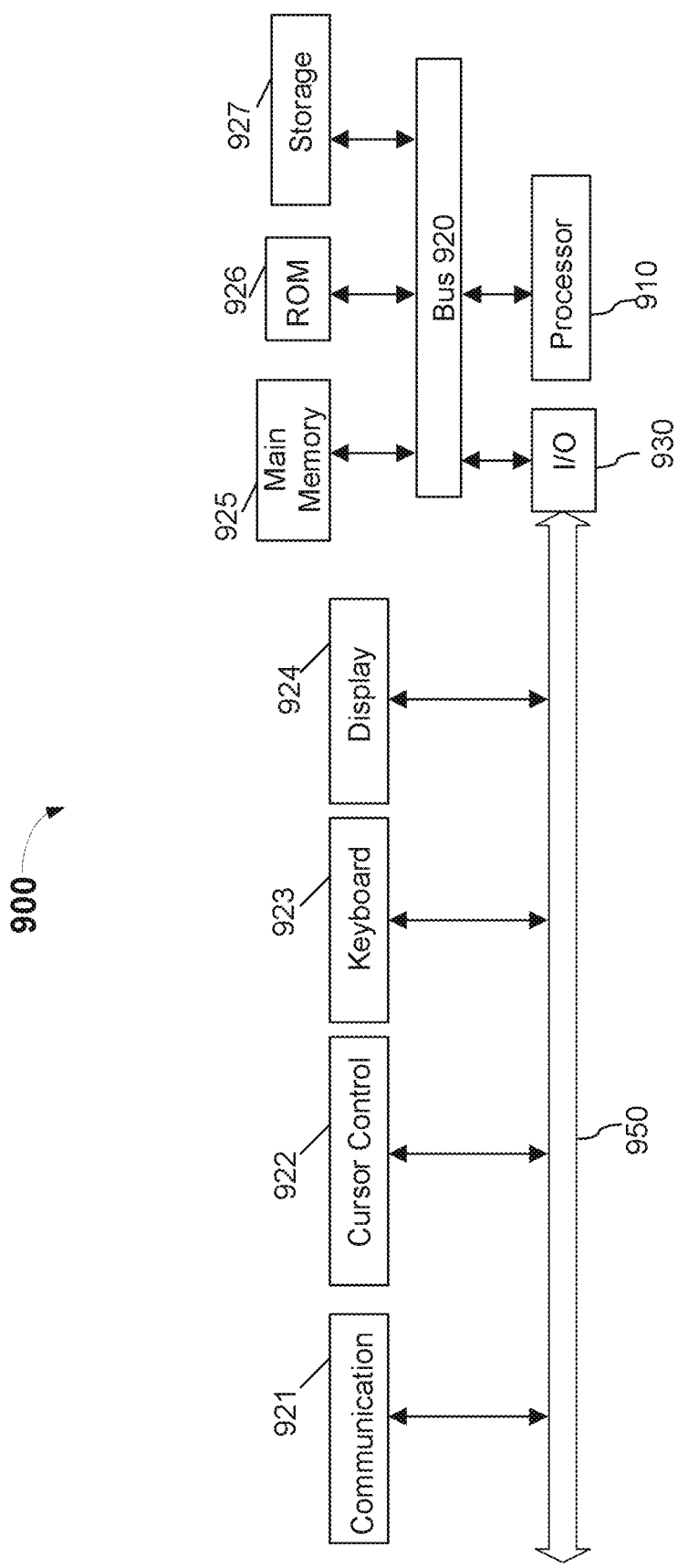
FIG. 7 illustrates one embodiment of a computer system.

FIG. 7 illustrates a computer system 900 on which printing system 130 and/or print controller 140 may be implemented. Computer system 900 includes a system bus 920 for communicating information, and a processor 910 coupled to bus 920 for processing information.

Computer system 900 further comprises a random access memory (RAM) or other dynamic storage device 925 (referred to herein as main memory), coupled to bus 920 for storing information and instructions to be executed by processor 910. Main memory 925 also may be used for storing temporary variables or other intermediate information during execution of instructions by processor 910. Computer system 900 also may include a read only memory (ROM) and or other static storage device 926 coupled to bus 920 for storing static information and instructions used by processor 910.

A data storage device 927 such as a magnetic disk or optical disc and its corresponding drive may also be coupled to computer system 900 for storing information and instructions. Computer system 900 can also be coupled to a second I/O bus 950 via an I/O interface 930. A plurality of I/O devices may be coupled to I/O bus 950, including a display device 924, device keyboard (e.g., an alphanumeric input device) 923 and or a cursor control device 922. The communication device 921 is for accessing other computers (servers or clients). The communication device 921 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. At least one non-transitory computer readable medium having instructions stored thereon, which when executed by one or more processors, cause the processors to:
   receive a histogram for each of a plurality of color planes;
   receive ink measurement data including a measured ink usage indicating a volume of ink consumed for each of the plurality of color planes;
   compute ink deposition curve data for each of the plurality of color planes based on the histograms and the ink measurement data; and
   transmit the ink deposition curve data.

2. The computer readable medium of claim 1, having instructions stored thereon, which when executed by the one or more processors, further cause the processors to generate the histogram for each of a plurality of color planes.

3. The computer readable medium of claim 2, wherein generating the histogram for each of a plurality of color planes comprises:
   receiving a test print job;
   generating a contone image corresponding to each of the plurality of color planes based on the test print job; and
   generating the histogram for each of the plurality of color planes based on the contone images.

4. The computer readable medium of claim 3, having instructions stored thereon, which when executed by the one or more processors, further cause the processors to compute the ink measurement data for each of the plurality of color planes.

5. The computer readable medium of claim 4, wherein computing the ink measurement data for each of the plurality of color planes comprises:
   applying printer settings data to a printer;

printing the test job at the printer based on the applied printer settings data;

receiving the measured ink usage during printing of the test print job; and computing the ink measurement data for each of the plurality of color planes based on the raw measured ink usage and a flushing ink usage for each of the plurality of color planes.

6. The computer readable medium of claim 5, wherein computing the ink measurement data for each of the plurality of color planes further comprises determining a number of images in the test print job that are to be printed.

7. The computer readable medium of claim 5, wherein the ink measurement data comprises a measurement of ink consumed to print the test print job and ink consumed during flushing operations performed during printing of the test print job.

8. The computer readable medium of claim 5, having instructions stored thereon, which when executed by the one or more processors, further cause the processors to calibrate the printer prior to receiving the ink measurement data.

9. The computer readable medium of claim 1, wherein transmitting the ink deposition curve data comprises displaying the ink deposition curve data at a graphical user interface.

10. The computer readable medium of claim 1, wherein computing the ink deposition curve data for each of the plurality of color planes uses an ink model.

11. A printing system comprising:

at least one physical memory device to store ink deposition curve compute logic; and one or more processors coupled with the at least one physical memory device, to execute the ink deposition curve compute logic to receive a histogram for each of a plurality of color planes, receive ink measurement data including a measured ink usage indicating a volume of ink consumed for each of the plurality of color planes, compute ink deposition curve data for each of the plurality of color planes based on the histograms and the ink measurement data and transmit the ink deposition curve data.

12. The printing system of claim 11, wherein the ink deposition curve compute logic generates the histogram for each of a plurality of color planes.

13. The printing system of claim 12, wherein generating the histogram for each of a plurality of color planes comprises receiving a test print job, generating a contone image corresponding to each of the plurality of color planes based on the test print job and generating the histogram for each of the plurality of color planes based on the contone images.

14. The printing system of claim 13, wherein the ink deposition curve compute logic computes the ink measurement data for each of the plurality of color planes.

15. The printing system of claim 14, further comprising a printer, wherein computing the ink measurement data for each of the plurality of color planes comprises applying printer settings data to a printer, print the test job at the printer based on the applied printer settings data, receiving the measured ink usage during printing of the test print job and computing the ink measurement data for each of the plurality of color planes based on the raw measured ink usage and a flushing ink usage for each of the plurality of color planes.

16. The printing system of claim 15, wherein computing the ink measurement data for each of the plurality of color planes further comprises determining a number of images in the test print job that are to be printed.

17. The printing system of claim 15, wherein the ink measurement data comprises a measurement of ink consumed to print of the test print job and ink consumed during flushing operations performed during printing of the test print job.

18. The printing system of claim 15, wherein the ink deposition curve compute logic comprises calibration logic to calibrate the printer prior to receiving the ink measurement data.

19. The printing system of claim 11, wherein transmitting the ink deposition curve data comprises displaying the ink deposition curve data at a graphical user interface.

20. The printing system of claim 11, wherein computing the ink deposition curve data for each of the plurality of color planes uses an ink model.

* * * * *